Oct. 31, 1950

G. WOOD 2,527,978

CUTTING TOOL

Filed Dec. 19, 1946

George Wood
Inventor
By Roy A. Plant
Attorney

Patented Oct. 31, 1950

2,527,978

UNITED STATES PATENT OFFICE 2,527,978

CUTTING TOOL

George Wood, Battle Creek, Mich.

Application December 19, 1946, Serial No. 717,170

9 Claims. (Cl. 29—96)

The present invention relates broadly to cutting tools, and more specifically to the combination of a special form of tool bit and holder for same.

In the past many forms of cutting tools have been proposed for use in machine shops, and among these have been various types of tool bits and holders for same. One of the most common of these is the "Armstrong" which is the combination of a specially ground cutting edge, square section, tool bit with its holder which is adapted for mounting on a tool post or the like. The cutting end of those tool bits projects out a considerable distance beyond the end of the tool holder, and in order to properly grind it for efficient operation, the services of a specialized tool grinding employee, using special grinding equipment, is required. That type of construction does not permit the use of tool bits made solely of long wearing, hard, brittle material, such as cemented carbide, since tool bits of that type have relatively low tensile trength, and need solid support below the cutting edge to prevent excessive breakage. In order to overcome this breakage, highly specialized cutting tool assemblies involving bits having a cemented carbide cutting portion mounted on an adjustable corrugated steel base member, with a corresponding holder mounting, have been proposed, and while these are very promising, in actual practice they have been very difficult to construct as well as properly grind for efficient use. The hot and elongated spiral shavings produced during cutting operations have also been hazardous and have caused trouble. As a result of this a few chip breakers have been designed to overcome the hazard involved, and same in turn have generally been either made adjustable or as separate attachments to be mounted on the tool holder, both of which make the chip breaker relatively expensive and liable to get out of order or be mislaid so as to be unavailable when wanted. It was a recognition of the difficulties and shortcomings of the prior art in this field which led to the conception and ultimate development of the present invention.

Accordingly among the objects of the present invention is the provision of a special form of cutting tool and holder therefor which will permit the cutting tool being brought into position for cutting from the smallest diameters to the largest within the capacity of the machine while being able to cut close to the chuck as well as to a moderate extent in such difficult to machine places as corners and relatively deep grooves and shoulders, all without the holder being an obstruction to the cutting work.

Another object is to provide a tool bit and holder combination which is simple, practical, efficient, and has relatively few parts.

Another object is to provide a special combination of tool bit and holder which includes a chip breaker, said chip breaker being either of fixed or roller construction.

A further object is to provide a special tool bit and tool holder wherein the tool holder has a suitable passageway therethrough for the tool bit, the angle at which said passageway passes through said holder being such as to predetermine the back rake of the tool bit throughout its full length.

A further object is to provide a tool bit which is preground with its upper edge at the proper top rake angle throughout its length, while the tool bit holder is provided with an opening for the tool bit which corresponds with the cross section of the tool bit and holds the latter at the proper angle.

A further object is to construct the tool bit holder so as to provide adequate support for the bit at its cutting end, thus making possible the use of hard, brittle, tool bits such as are formed from cemented carbide.

A further object is to provide a special tool bit and tool bit holder combination which may be quickly and efficiently ground by inexperienced help.

A further object is to provide the head of the tool bit holder with an under surface which sets at a compound angle suitable for gaging the side rake and front rake of the tool when the latter is ground by bringing it against the side of a substantially flat face rotating grinding wheel with the base of the head of the tool bit holder flat on the table thereof.

Still further objects and advantages of the present invention will appear as the description proceeds.

To the accomplishment of the foregoing and related ends, the invention, then, consists of the means hereinafter fully described and particularly pointed out in the claims, the annexed drawing and the following description setting forth in detail certain means for carrying out the invention, such disclosed means illustrating, however, but several of various ways in which the principle of the invention may be used.

In the annexed drawing—

While the tool bit and tool bit holder of the present invention will be described with rake angles which have been found suitable for efficient operation in the cutting of steel and alloys, such as annealed alloy tool steel, the invention is not limited to the cutting of that specific material since it is equally suitable for use in connection with the machining of other materials wherein simplified tool sharpening, and rapid and efficient cutting are likewise desired.

Figure 1:
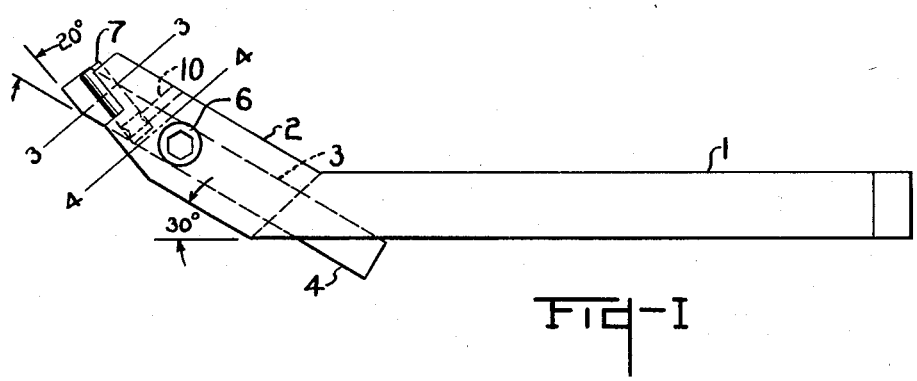
Figure 1 shows a top view of a preferred form of the present invention.

Referring more particularly to the drawing it will be noted that the tool has a shank 1 of substantially rectangular section, with the main portion of the head 2 inclined sidewise at an angle of approximately 30°. This head portion has a tool bit channel 3 which passes lengthwise thereof and completely therethrough. Such channel, which is of a section closely fitting tool bit 4, preferably extends downward from the cutting end of the assembly at an angle agreeing with the predetermined back rake of the tool bit, which for use in the cutting of tool steel is approximately 8°. The cutting side of head 2 adjacent its end may be further tapered back an additional amount in excess of the original 30°, and such additional amount is preferably about 20° as shown in Figure 1. This provides additional clearance facilitating the grinding and use of the tool bit, which extends partially out of the side of the head, while leaving the head rigid for supporting the bottom of the tool bit under operating conditions.

In order to simplify the manufacture of the tool assembly and the grinding of the tool bit in use, the latter is preferably made with 90° lower corners while the top tapers sidewise and back approximately 12° to provide the top rake which is preferably used in cutting annealed tool steel, although the invention is not limited to that specific top rake angle. The tool channel 3 is of corresponding cross section and slightly larger than tool bit 4 to facilitate a close fitting free passage of the latter through the channel, the bottom of which is preferably in a plane perpendicular to the side faces of shank 1 to simplify construction. To hold the tool bit in place, head 2 is provided with a threaded opening 5 extending upward from the tool bit, said opening being adapted to be threadedly engaged by a set screw 6 which may be of any desired construction such as the hollow head type shown, and which it is intended shall be considered as diagrammatically illustrating the various equivalent forms of set screws which may be used for this purpose.

Figure 3:
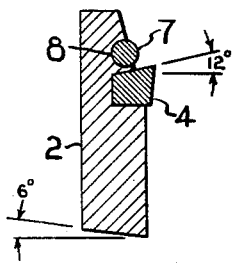
Figure 3 shows a section taken at line 3—3 of Figure 1.
Figure 4:
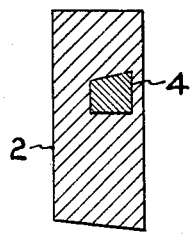
Figure 4 shows a section taken at line 4—4 of Figure 1.
Figure 5:
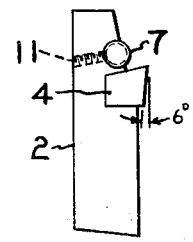
Figure 5 shows an elevational view of the left hand end face of the tool illustrated in Figure 1.

For most purposes a tool bit side rake of approximately 6°, Figure 5, is suitable. In order to facilitate the grinding of same, the base of head 2 is preferably formed with a 6° sidewise slope, as shown in Figure 3. When grinding the tool bit 4 with a flat face grinder, or the equivalent, the tool bit may be left in the tool holder, or preferably slid forward in it, and by setting the base of the tool holder head on the table of the grinder the tool assembly will thus be tipped sidewise so that the side rake of the tool bit will become vertical and hence it will only be necessary to bring the vertical face of the tool bit against the vertical side of the rotating grinding wheel in conventional manner to grind the bit at the proper side rake angle. The upper edge of the side rake face, after grinding, is preferably parallel to the upper edge of the head 2 adjacent the cutting area, or at an angle of approximately 50° with the shank of the tool. This not only facilitates machining into corners and moderate grooves, but makes it easy for the person grinding the tool to visually gage and grind same with suitable accuracy.

Figure 2:
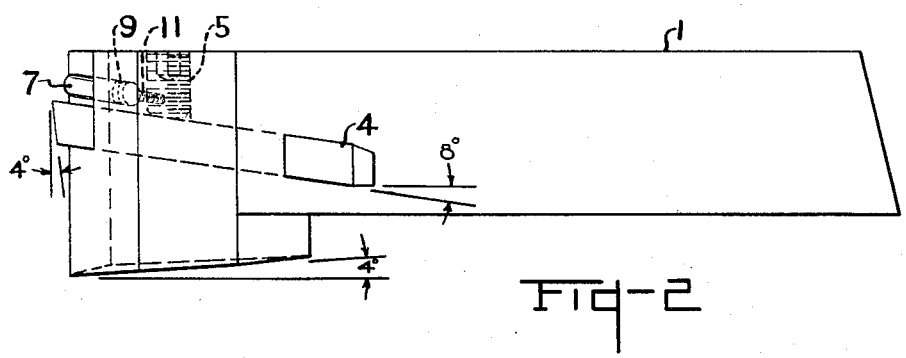
Figure 2 shows a side elevation of the tool assembly shown in Figure 1.

The front rake of the tool bit is preferably about 4°, as shown in Figure 2. In order to facilitate the grinding of this front rake, the base of head 2 of the tool holder is preferably provided with a 4° lengthwise slope. With the base of head 2 placed on the table of the grinding machine the front rake face of tool bit 4 will become vertical and hence same can be ground by merely moving it back and forth in contact with the vertical face of the rotating grinding wheel in conventional manner. It is thus obvious that either the front rake or the side rake of the tool bit may be satisfactorily ground by inexperienced help, and if desired, the operator using the tool may thus grind his own tool bits to a degree of accuracy difficult to obtain previously even with skilled grinding help and special tool grinding equipment. For most purposes the included angle between the front rake and the side rake faces of the tool bit should be in the range of from 70° to 90°, with 75° preferable. Maintaining this included angle dimension facilitates clearance for the end of the tool bit under normal machining conditions.

The back rake of the tool bit 4 facilitates tipping the turned shaving backward in a spiral, and in order to break up the turned shaving into small chips so that the danger of injury from same is minimized, a chip breaker is provided. A preferred form of this chip breaker consists of a chip breaking roller 7, which is a little above and substantially parallel to the cutting edge of tool bit 4, and which closely but rotatably fits a suitable bore 8 in the end of head 2 of the tool bit holder in the cutaway portion directly behind the cutting edge of the tool bit. In order to hold the chip breaker roller against accidental displacement bore 8 extends back into the head of the tool holder beyond the cutaway portion, and the roller is provided with a groove 9 near its end at the bottom of bore 8. At the same time head 2 of the tool bit holder is provided with a threaded opening 10 in alignment with said groove 9, and a suitable set screw 11 threadedly engages said opening with the point of the set screw loosely entering groove 9 of chip breaker roller 7, thus locking same in place. Under actual conditions of use, chip breaker roller 7 will be made out of hardened material, and will rotate counterclockwise (Figure 5) during the breaking of the turnings as they come from the cutting edge of the tool bit.

Figure 6:
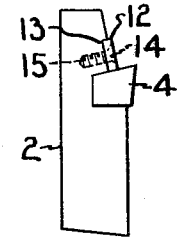
Figure 6 shows an elevational view similar to Figure 5, but illustrating a modified construction.

Another form of chip breaker is illustrated in Figure 6 wherein the chip breaker 12 is in the form of a flat plate which preferably slopes backward as shown, and for increased stability is countersunk into channel 13 in head 2 directly above tool bit 4. This chip breaker plate 12 may be held in place by means of a screw 14 passing through a suitably located opening in chip breaker plate 12 and threadedly engaging threaded bore 15 in head 2. The rigidly mounted chip breaking plate 12, the same as chip breaking roller 7, may be replaced from time to time when required due to wear under conditions of use.

Other modes of applying the principle of my invention may be employed instead of these explained, change being made as regards the mechanism herein disclosed, provided the means stated by any of the following claims or the equivalent of such stated means be employed.

I therefore particularly point out and disinctly claim as my invention:

1. A cutting tool, comprising a tool holder, a tool bit, and means for holding the tool bit in place in said tool holder, said tool holder having a passageway extending through the head portion thereof to receive said tool bit, said passageway being inclined to produce the back rake of the tool bit, and being of a cross section agreeing with and slightly larger than said tool bit, the top face of which is preformed full length to determine the top rake which is crosswise of the tool bit when assembled in said tool holder, the tool holder having a head portion and a shank, said head portion being bent sidewise at an angle of approximately 30° to the axis of the shank, said passageway passing completely through said head portion with the bottom of the passageway in a plane substantially perpendicular to the sides of said shank, said head portion being further tapered back approximately 20° at its free end so that said passageway passes out therethrough and said tool bit at least protrudes sidewise therefrom while being supported on the bottom of said passageway.

2. A cutting tool, which comprises a tool holder, a tool bit, means for holding said tool bit in place in said tool holder, and a rotary chip breaker, wherein said tool holder has a bore which is behind and higher than the cutting edge of said tool bit with a minor portion of said bore on the side adjacent the tool bit being open, said chip breaker closely but rotatably fitting said bore and extending through said side opening in position to engage and break shavings produced during the use of the cutting tool.

3. A cutting tool, which comprises a tool holder, a tool bit, means for holding said tool bit in place in said tool holder, a rotary chip breaker, and means for holding said chip breaker in place, wherein said means for holding said chip breaker in place comprises a groove in said chip breaker and a member which engages said groove while leaving said chip breaker free to rotate, whereby said chip breaker is positively held against accidental endwise removal.

4. A cutting tool, comprising a tool holder a tool bit, means for holding said tool bit in place in said tool holder, and a chip breaker, said tool holder having a head and shank, said head having a passageway extending therethrough and adapted to have said tool bit closely but slidably fit same, said passageway being inclined to produce the back rake of said tool bit, said head portion being inclined sidewise at an angle of approximately 30° to the axis of the shank, said head portion being further tapered back approximately 20° at its free end so that said passageway passes out therethrough with said tool bit at least protruding sidewise therefrom while being supported on the bottom of said passageway, and the top face of the tool bit throughout its length is preformed at the predetermined top rake angle.

5. A cutting tool, which comprises a tool holder, a tool bit, a chip breaker, and means for holding said tool bit in place, said tool holder having a shank and a head, the underface of said head tapering sidewise and back so that when the head is mounted on a flat surface the side rake of the cutting end of the tool bit will be substantially perpendicular to said flat surface, said head having an outwardly opening groove therein spaced from the tool bit and behind and higher than the cutting edge of the tool bit for the reception of said chip breaker for the positioning of the chip breaker to engage and break shavings produced during the use of the cutting tool.

6. A cutting tool, which comprises a tool holder, a tool bit, a chip breaker, and means for holding said tool bit in place, said tool holder having a shank and a head, the underface of said head tapering toward said shank so that when said head is mounted on a flat surface the front rake of the cutting end of the tool bit will be substantially perpendicular to said flat surface, said head having an outwardly opening groove therein spaced from the tool bit and behind and higher than the cutting edge of the tool bit for the reception of said chip breaker for the positioning of the chip breaker to engage and break shavings produced during the use of the cutting tool.

7. A cutting tool, which comprises a tool holder, a tool bit, a chip breaker, and means for holding said tool bit in place, said tool holder having a shank and a head, the underface of said head being at a compound angle wherein it tapers sidewise and back, and also toward said shank, so that when the underface of said head is mounted on a flat surface the side rake and the front rake of the cutting end of the tool bit will be substantially perpendicular to said flat surface, said head having an outwardly opening groove therein spaced from the tool bit and behind and higher than the cutting edge of the tool bit for the reception of said chip breaker for the positioning of the chip breaker to engage and break shavings produced during the use of the cutting tool.

8. A cutting tool, which comprises a tool holder, a tool bit, a chip breaker, and means for holding said tool bit in place, said tool holder having a shank and a head, the underface of said head being at a compound angle wherein it tapers sidewise and back, and also toward said shank, so that when the underface of said head is mounted on a flat surface, the side rake and the front rake of the cutting end of the tool bit will be substantially perpendicular to said flat surface, said chip breaker being behind and higher than the cutting edge of said tool bit and in position to engage and break shavings produced during the use of the cutting tool, said chip breaker being of rotary construction, said head being bored substantially parallel to the side cutting edge of the tool bit but above and higher than same with a minor portion of said bore open on the side adjacent the tool bit, said rotary chip breaker closely but rotatably fitting said bore and extending sidewise through said opening, and means for holding said rotary chip breaker in place.

9. A cutting tool, which consists of a tool holder, a tool bit, means for holding said tool bit in place, a chip breaker, means for holding said chip breaker in position to engage and break shavings produced during the use of the cutting tool, said tool holder having a shank and a head, said head portion being inclined sidewise at an angle of approximately 30° to the axis of the shank and having a passageway extending lengthwise therethrough for said tool bit, said passageway being inclined to produce the back rake of the tool bit, said tool bit having its upper face slope back and down throughout its length to suitably produce the top rake of the tool when assembled in the holder, said head portion being further tapered back approximately 20° at its free end so that said passageway passes out therethrough and said tool bit at least protrudes sidewise therefrom while being supported on the bottom of said passageway, the underface of said head being at a compound angle wherein it tapers sidewise and back, and also toward said shank, so that when the underface of said head is mounted on a flat surface the side rake and the front rake of the cutting end of the tool bit will be substantially perpendicular to said flat surface.

GEORGE WOOD.

REFERENCES CITED

The following references are of record in the file of this patent:

UNITED STATES PATENTS

| Number | Name | Date |
|---|---|---|
| 1,036,102 | Hartness | Aug. 20, 1912 |
| 1,648,380 | Dover | Nov. 8, 1927 |
| 2,385,010 | Lipani | Sept. 18, 1945 |

FOREIGN PATENTS

| Number | Country | Date |
|---|---|---|
| 85,429 | Switzerland | Sept. 9, 1919 |
| 138,141 | Great Britain | Feb. 5, 1920 |
| 117,469 | Australia | Sept. 3, 1943 |

OTHER REFERENCES

American Chemist, September 13, 1945, page 112. (Copy in Scientific Library, U. S. Patent Office.)